United States Patent

Taylor

[15] 3,673,520

[45] June 27, 1972

[54] DELAY EQUALIZER NETWORK INCLUDING NEGATIVE DELAY CIRCUITS

[72] Inventor: Roland C. Taylor, 60 Hudson St., New York, N.Y. 10013

[22] Filed: Dec. 14, 1970

[21] Appl. No.: 97,613

Related U.S. Application Data

[63] Continuation-in-part of Ser. No. 803,661, March 3, 1969, abandoned.

[52] U.S. Cl. ................................333/28 R, 333/76, 333/74, 333/77

[51] Int. Cl. ...........................................................H03h 7/04

[58] Field of Search .................................333/70, 76, 18, 28

[56] References Cited

UNITED STATES PATENTS

| | | | |
|---|---|---|---|
| 3,122,716 | 2/1964 | Whang | 333/28 |
| 3,336,539 | 8/1967 | Kwartiroff et al. | 333/18 |
| 3,449,696 | 6/1969 | Routh | 333/6 |
| 2,969,509 | 1/1961 | Bangert | 333/28 |
| 3,514,727 | 5/1970 | Matsumoto | 333/76 |
| 2,922,128 | 10/1959 | Weinberg | 333/74 |

*Primary Examiner*—Herman Karl Saalbach
*Assistant Examiner*—C. Baraff
*Attorney*—Michael I. Borsella

[57] ABSTRACT

An equalizer circuit for equalizing delay in the passband of signals in a transmission line employs both positive and negative delay equalizer sections. By use of negative delay which subtracts from the delay in the line, uniform delay of lower time magnitude is obtainable than by use of positive delay circuits alone. Also, by using one or more negative delay sections a given equalization envelope is obtainable employing fewer equalizer sections. Lattice or bridge-T circuits are employed in the delay equalizer. The negative delay lattice sections include resistance elements selected in accordance with criteria herein set forth to provide the negative delay.

6 Claims, 10 Drawing Figures

INVENTOR
ROLAND C. TAYLOR
BY J. B. Burke
ATTORNEY

INVENTOR
ROLAND C. TAYLOR
BY J. B. Burke
ATTORNEY

INVENTOR
ROLAND C. TAYLOR
BY J. B. Burke
ATTORNEY

DELAY EQUALIZER NETWORK INCLUDING NEGATIVE DELAY CIRCUITS

This application is a continuation-in-part of Ser. No. 803,661, filed Mar. 3, 1969 now abandoned.

This invention concerns delay equalizer networks employing both positive and negative delay equalizer circuits to linearize time delay of frequencies in a passband while minimizing the number of equalizer sections required.

It is known that when signals occupying a passband of frequencies are transmitted via a transmission line the several frequencies undergo different relative phase or time delay. In order to reproduce at the receiving end of the transmission line signals having wave shapes substantially identical to those of the signals at the transmitting end, it is necessary and customary to employ delay equalizing circuits. Generally, positive time delay circuits are employed. These may be lattice or bridged-T sections. In order to obtain reasonably acceptable equalization a very large number of such positive time delay circuits may be required so that the delay equalizer is often more complicated and expensive than the associated networks.

The present invention is directed at substantially reducing the complexity and cost of such conventional delay equalizers by providing delay equalizer networks with a combination of both positive and negative delay circuits or sections.

The invention will be explained in further detail in connection with the drawings, wherein.

Figures 3, 4:
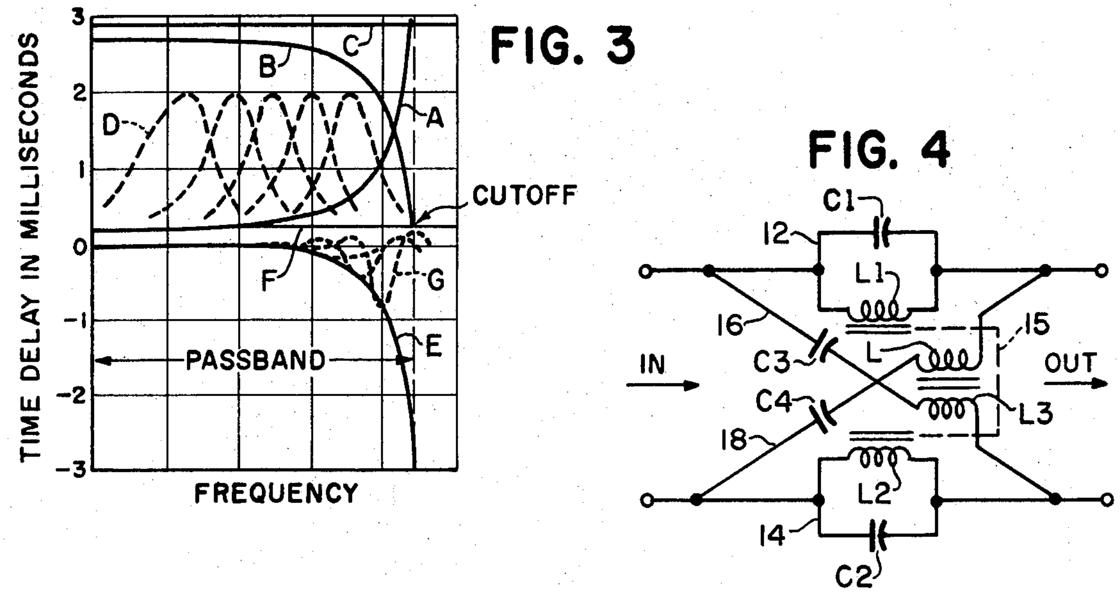
FIG. 3 is a frequency-delay graph used in explaining the invention.
FIG. 4 is a diagram of a positive delay circuit employed in the delay equalizer network of FIGS. 1 and 2.

Referring first to FIG. 3, curve A depicts the delay in the passband region of a signal in a transmission path. Curve B is the delay characteristic of a typical positive delay equalizer which would be conventionally used to add delay to that depicted by curve A. The result is to delay the signal uniformly at all frequencies as indicated by curve C. The delay equalizer which would be used for this purpose would have a multiplicity of lattice or bridged-T sections whose individual delay characteristics are indicated by dotted line curves D. These delay curves add up to produce the delay characteristic depicted by curve B.

A typical lattice circuit 10 producing positive time delay is shown schematically in FIG. 4. Parallel resonant circuit 12 consists only of inductance L1 and capacitance C1. Parallel resonant circuit 14 consists only of inductance L2 and capacitance C2. The two resonant circuits 12 and 14 are coupled by mutual inductance indicated by dotted line 15. Series resonant circuits 16 and 18 consist respectively of capacitance C3, inductance L3 and capacitance C4 and inductance L4. Circuits 16 and 18 are coupled by mutual inductance of inductances L3, L4. The series resonant circuits are connected at opposite ends across input and output terminals respectively of the alternate parallel resonant circuits.

Figure 5:
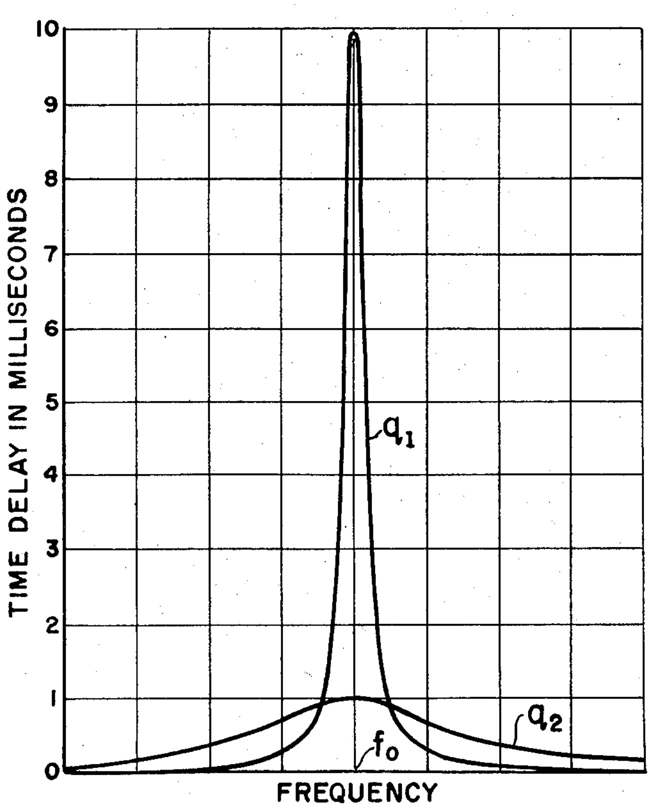
FIG. 5 is a graphic diagram used in explaining the characteristics of the circuit of FIG. 4.

A distinct disadvantage of the prior method of delay equalization by use of positive delay lattice circuits exclusively is that in equalizing the delay near the cutoff frequency many lattice circuits or sections 10 are required. This is due to the fact that the positive slope of curve A which is greatest at this point as indicated in FIG. 3, requires that the slope of the delay characteristic of the lattice sections in this cutoff region be correspondingly greater. In order to approximate the curvature of the part of curve B near cutoff frequency it is necessary to use lattice sections of high $q$, where $q$ is analogous to the Q factor of a resonant circuit. The lattices of high $q$ give the steeper slopes which together add up to produce a characteristic of negative slope as depicted by curve B near the cutoff frequency. FIG. 5 depicts the delay characteristics of two positive delay lattice circuits such as shown in FIG. 4 but designed for different maximum delays respectively at center frequency $f_o$. As indicated in FIG. 5, one lattice circuit has delay characteristic $q1$ which has steep slopes and is effectively narrower than characteristic $q2$ of the other lattice circuit. Delay characteristic $q2$ is wider, with shallower slopes and less delay at frequency $f_o$. It must be emphasized that many lattice sections 10 having positive delay effect are required to make up this region of steep slope of curve B in FIG. 3. This greatly adds to the cost and complexity of the delay equalizer.

The present invention avoids to a large extent the high cost and complexity of delay equalizers employing many positive delay equalizer sections by utilizing delay equalizer lattice or bridged-T sections having both positive and negative delay characteristics.

Figure 6:
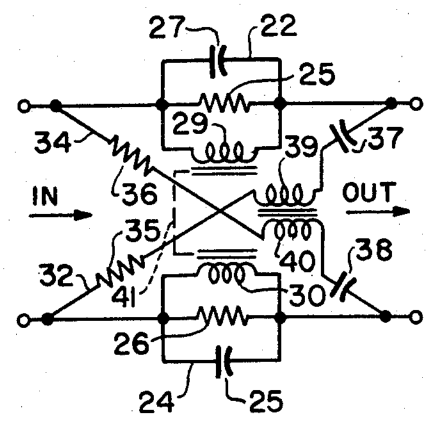
FIG. 6 is a diagram of a negative delay circuit employed in the delay equalizer network of FIG. 1.

A typical lattice circuit or section having a negative delay characteristic is depicted FIG. 6. This lattice circuit 20 has parallel resonant circuits 22 and 24 in the parallel legs, respectively consisting of resistances 25, 26, capacitances 27, 28 and inductances 29, 30. Circuit 20 also has series resonant circuits 32, 34 in the branched legs respectively consisting of resistances 35, 36, capacitances 37, 38, and inductances 39, 40. Inductances 39, 40 are mutually coupled. Also, inductances 29 and 30 are mutually coupled as indicated by dotted line 41. It will become apparent below that while it is preferred that these inductances are mutually coupled as indicated, such mutual coupling is not essential to obtain negative delay.

Figure 9:
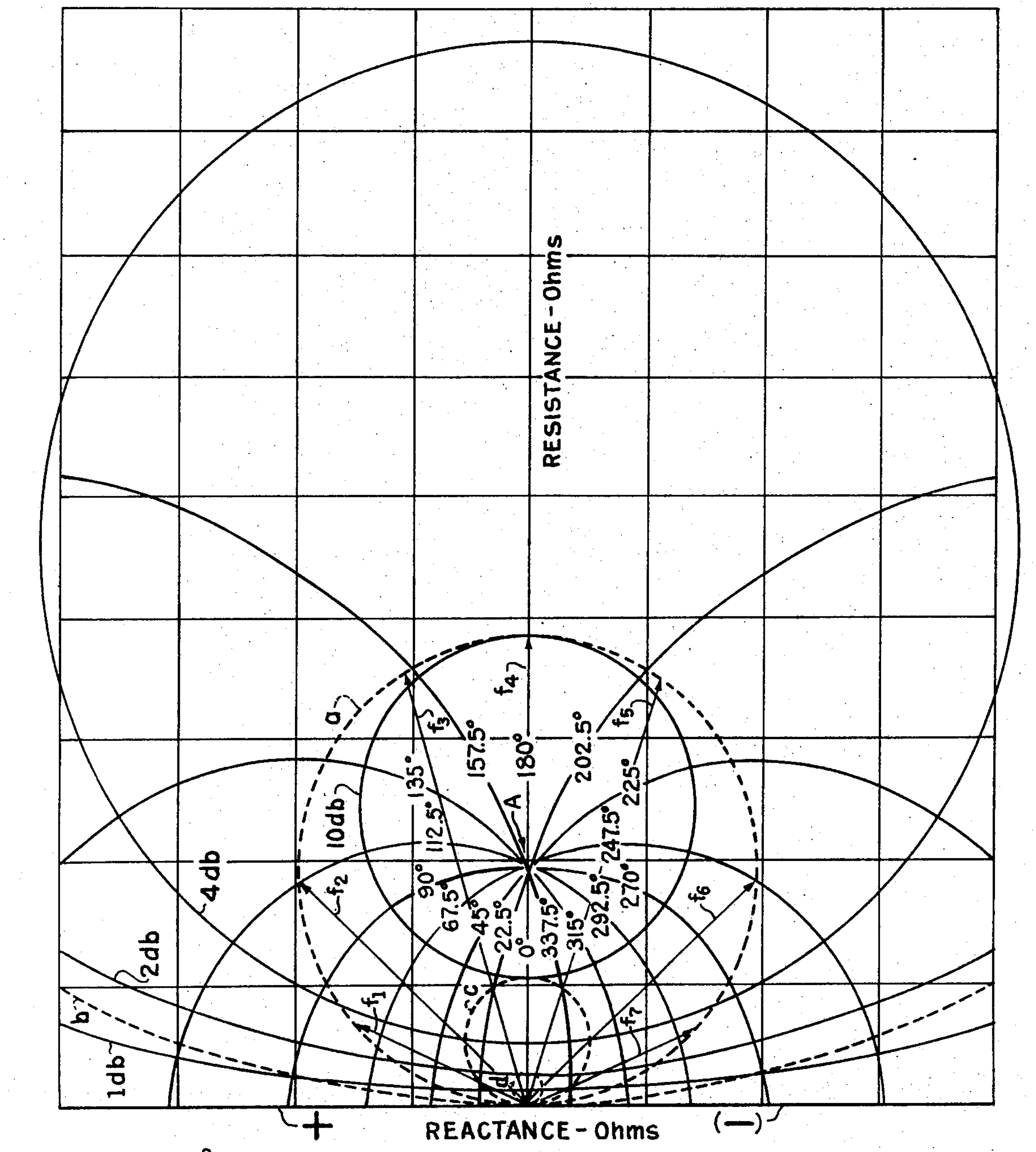
FIG. 9 is a graphical illustration of the hyperbolic tangent of a complex angle including various curves useful in the design of positive and negative delay equalizer lattice sections.

Referring now to FIG. 9 which is a graphical illustration useful in understanding the design of both positive and negative delay lattice sections, this graphical illustration is that employed in Chapter 12 of the well-known text "Communication Networks Vol. 2," by Ernst A. Guillemin, published by John Wiley and Sons, 1935. The horizontal and vertical coordinates are resistance and reactance respectively. The solid circles are the familiar double family of circles for the hyperbolic tangent of a complex angle which conveniently represent, in the case of the first family of circles intersecting at the pole marked A, the circles of constant equalizer phase shift, and for the family of circles including those marked 1 db, 4 db, and 10 db, represent circles of constant equalizer attenuation. As is well-known to these skilled in the art this double family of circles prevails when the parallel and branched impedances of the equalizer lattice section are in accordance with the following equation:

$$Z_1 Z_2 = R_o^2 \quad (1)$$

where:

- $Z_1$ is the impedance of each of the parallel legs of the section,
- $Z_2$ is the impedance of each of the diagonal legs of the lattice section, and
- $R_o$ is the load resistance.

The four dotted circles in FIG. 9 identified $a,b,c,$ and $d$ are impedance loci of anti-resonant two terminal networks. Thus, any one of these dotted circles represents the loci of variable singular values of reactance and resistance which when placed in series will have, at any given frequency, the same impedance as an equivalent parallel tuned circuit having fixed inductance, capacitance, and resistance elements in parallel. Looking first at dotted circle $a$, as frequency increases from zero on impedance vector may be drawn whose paint traces circle $a$, in a clockwise direction, until the resonant frequency is obtained when the reactive impedance is zero and the vector is thus horizontal. As the frequency is further increased the vector continues clockwise and traces the balance of circle *a* toward infinite frequency and declining resistive impedance back to the origin. Also, dotted circle *a* has been drawn to a scale such that if its impedance is used as the parallel resonant branches of a lattice section and its inverse impedance, in accordance with the law of equation ( 1) above, is used as the series tuned diagonal legs of the lattice section the maximum attenuation of such a lattice section is 10 db. Since it encloses the pole A this lattice section would produce positive delay equalization. Similarly, the scale for dotted circle *b* is a more usual case associated with a positive delay equalizer section having 2 db attenuation. For reasons which will become apparent the impedance loci of dotted circles *c* and *d* are associated with negative delay equalizer sections having 10 db and 2 db maximum attenuation respectively.

It will be understood by those skilled in the art that in order to obtain negative envelope delay of a group of frequencies within a passband, it is necessary that the impedances of a lattice section, including the resistances, be chosen such that the rate of change of output phases angle with respect to frequency is negative. The reason for this is that envelope delay is the limit of the ratio of change in phase angle to $2\pi$ times the change in frequency.

An example is seen with respect to dotted circles *a* and *c*. Looking first at dotted circle *a* seven impedance vectors $f_1$–$f_7$ are drawn which prevail at increasing frequencies from $f_1$ to $f_7$. At frequency $f_1$ the circle *a* intersects a member of the constant phase angle family of circles at a phase angle value of about 80°. At frequency $f_2$, the intersection is at a phase angle of about 112°. The approximate phase angle intersections of circles a and c at frequencies $f_1$–$f_7$ are provided below in tables I and II respectively.

Table I - Circle *a*

| Frequency | Phase Angle |
|---|---|
| $f_1$ | +80° |
| $f_2$ | +112° |
| $f_3$ | +150° |
| $f_4$ | +180° |
| $f_5$ | +210° |
| $f_6$ | +247° |
| $f_7$ | +280° |

Table II - Circle *c*

| Frequency | Phase Angle |
|---|---|
| $f_1$ | +22.5° |
| $f_2$ | +33° |
| $f_3$ | +22.5° |
| $f_4$ | 0° |
| $f_5$ | +337.5° |
| $f_6$ | +327° |
| $f_7$ | +337.5° |

It can be seen from Table II that the rate of change of phase angle with respect to frequency in reference to circle *c* is first positive between frequency $f_1$ and $f_2$, becomes negative at a frequency slightly higher than $f_2$, remains negative up to a frequency slightly higher than $f_6$, and then becomes positive. Thus, in reference to circle *c* negative envelope delay is attainable between the frequencies approximately illustrated as $f_2$ to $f_6$.

Thus, it can be seen that all lattice sections for which impedance loci lie to the left of the phase angle pole A, therefore not enclosing pole A, will exhibit negative delay characteristics for a given envelope of frequencies above and below the resonant frequency. At the horizontal vector, $f_4$, the frequency is the resonant frequency and is the frequency at which the greatest negative delay is obtainable. The diameter of the dotted circle, such as *c*, at the resonant frequency, is the resistance desired in the parallel tuned legs of the lattice section. Its inverse, in accordance with Equation ( 1) above, is the required resistance in the series tuned branches of the lattice section. In view of the foregoing in order to obtain a lattice section having negative delay it is necessary to select the respective impedances such that the impedance locus passes to the left of the pole A as shown in FIG. 9. The preferred values of the circuit elements for this condition can be mathematically expressed as will be seen below.

For reasons which will become apparent, it is preferred to use a combination of positive and negative delay sections for equalization of transmission characteristics having steeply changing time delay as shown in FIG. 3. Since the design techniques of positive delay equalizer sections is well known in the art it is not necessary to treat them here. The design criteria for negative delay lattice sections ought be abundantly clear from the above discussion in reference to FIG. 9. An alternate method for designing a negative delay lattice section will now be proposed using several mathematical relationships. First, a tolerably small attenuation $x$ is selected from which the resistance of the parallel tuned legs, $R_2$, is determined by the usual attenuation pad equation:

$$R_2 = R_0 \tanh \frac{x}{2} \qquad (2)$$

By Analysis of chapters 4, 10, and 12 of the aforementioned text by Guillemin, and in the light of FIG. 9, I have derived the following relationship for the maximum negative delay, $T_o$:

$$T_0 = \frac{\left(4Q \sinh \frac{x}{2}\right)}{W_0} \qquad (3)$$

where:

$Q$ is the conventional quality factor of a resonant circuit, and $W_o$ is the resonant frequency expressed in radians per second.

Also:

$$Q = \frac{R_2}{W_0 L_2}, \text{ and } W_0^2 = \frac{1}{L_2 C_4} \qquad (4)$$

For best impedance matching Equation ( 1) applies, namely, $Z_1 Z_2 = R_o^2$, which together with the above equations can be used to solve for the values of the various circuit elements as follows:

$$R_1 R_2 = R_0^2 \qquad (5)$$

$$R_2 = R_0 \tanh \frac{x}{2},\ L_2 = R_2/W_0 Q,\ C_4 = Q/W_0 R_2 \qquad (6)$$

$$R_1 = R_0 \coth \frac{x}{2},\ L_3 = R_1 Q/W_0,\ C_1 = 1/R_1 Q W_0 \qquad (7)$$

where:

$L_2$ is the inductance in each of the parallel tuned legs, $C_4$ is the capacitance in each of the parallel tuned legs, $L_3$ is the inductance in each of the series tuned branches, $C_1$ is the capacitance in each of the series tuned branches, and $R_1$ is the resistance in each of the series tuned branches.

It should be noted at this point that the resistance in the parallel tuned legs of a negative delay section is small compared to the resistance in the series tuned diagonal legs. This is quite the opposite of the conventional design of a positive delay section. Thus, the predominant current path in the negative delay section is through the parallel tuned legs at all frequencies including the resonant frequency whereas in a positive delay equalizer the predominant current path shifts from the parallel tuned branches to the series tuned branches at frequencies near and including the resonant frequency.

Figure 7:
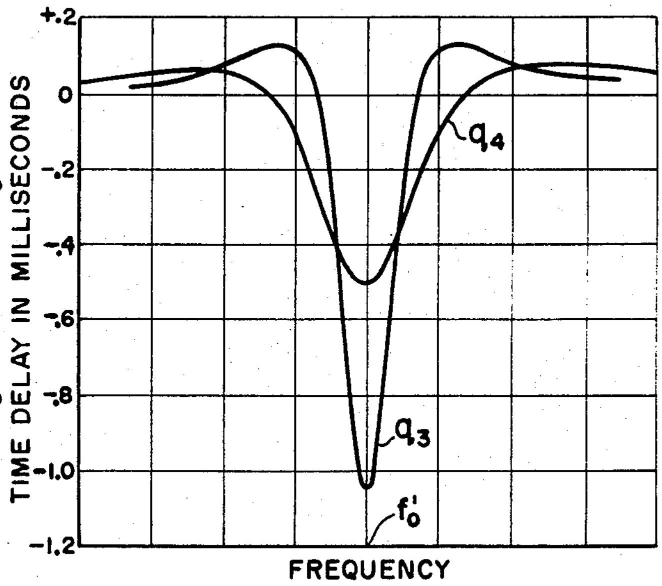
FIGS. 7 and 8 are graphic diagrams used in explaining the characteristics of the circuit of FIG. 6.
Figure 8:
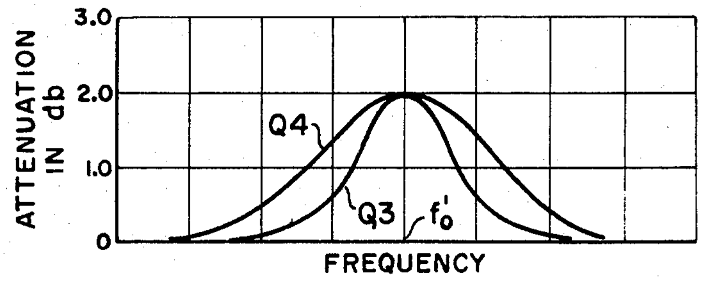

FIG. 7 shows delay characteristics of two negative delay lattice circuits such as shown in FIG. 6, designed for different maximum negative delays at center frequency $f_o'$. In general, rather steep negative slopes are obtainable with characteristics $q_3$ and $q_4$. FIG. 8 shows incidental attenuation frequency characteristics $Q_3$ and $Q_4$ for the same two circuits having negative delay characteristics $q_3$ and $q_4$ respectively. It will be noted that the circuit which has negative delay with steepest slopes, has incidental attenuation with steeper slopes on opposite sides of the center frequency $f_o'$.

Curve E of FIG. 3 shows the delay characteristics of a plurality of interconnected negative delay lattice sections of the type shown in FIG. 6. Curve E added to curve A produces curve F which depicts delay equalized at a lesser time than that of delay curve C. However to produce delay F many negative sections may be required having dotted characteristics G. A delay equalizer employing only negative delay lattice sections may have objectionably high attenuation. There is a basic difference between the use of conventional positive delay sections and the negative delay sections which are here described. The delay of positive delay sections is substantially independent of incidental dissipation while the delay of negative delay sections varies as the square of the circuit Q. An incidental attenuation must be accepted, and can be strictly controlled when negative delay equalizers are used.

Figure 10:
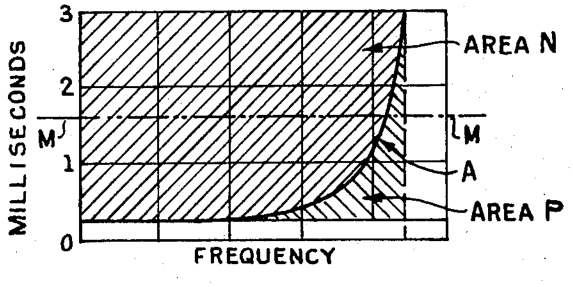
FIG. 10 is a graphical illustration of the equalization areas which can be employed to equalize the transmission characteristic curve A of FIG. 3.

The relation between the two types of equalizers can be illustrated by the areas shown in FIG. 10 which is similar to FIG. 3 and includes curve A. Area N can be built up of positive delay sections or area P with negative delay sections. While area P is much smaller than area N the number of sections required is not necessarily less since the area under a negative delay curve, for one section having very small attenuation, is much smaller than the area under a positive delay curve for one section. It can be expected that an incidental attenuation $x$ can be found that will make the number of the negative delay sections to build up area P the same as the number of positive delay sections to build up area N, and a saving in number of sections would then require the acceptance of a larger attenuation.

A preferred alternate which I have found to be particularly useful is a combination of positive delay and negative delay sections. Thus, that part of area P which is above line M—M is equalized with negative delay sections and the part of area N below line M—M is equalized with positive delay sections. The position of the horizontal line M—M may be varied to give the most desirable design as to total number of sections, incidental attenuation, cost etc. The line M—M then approximates the resulting delay of the equalized network. Thus, it is unnecessary to provide the positive equalizer sections to make up the area N above line M—M and also unnecessary to provide the negative delay sections to make up area P below line M—M. This technique is employed for the circuit 100 of FIG. 1 to which reference is now made.

Figures 1, 2:
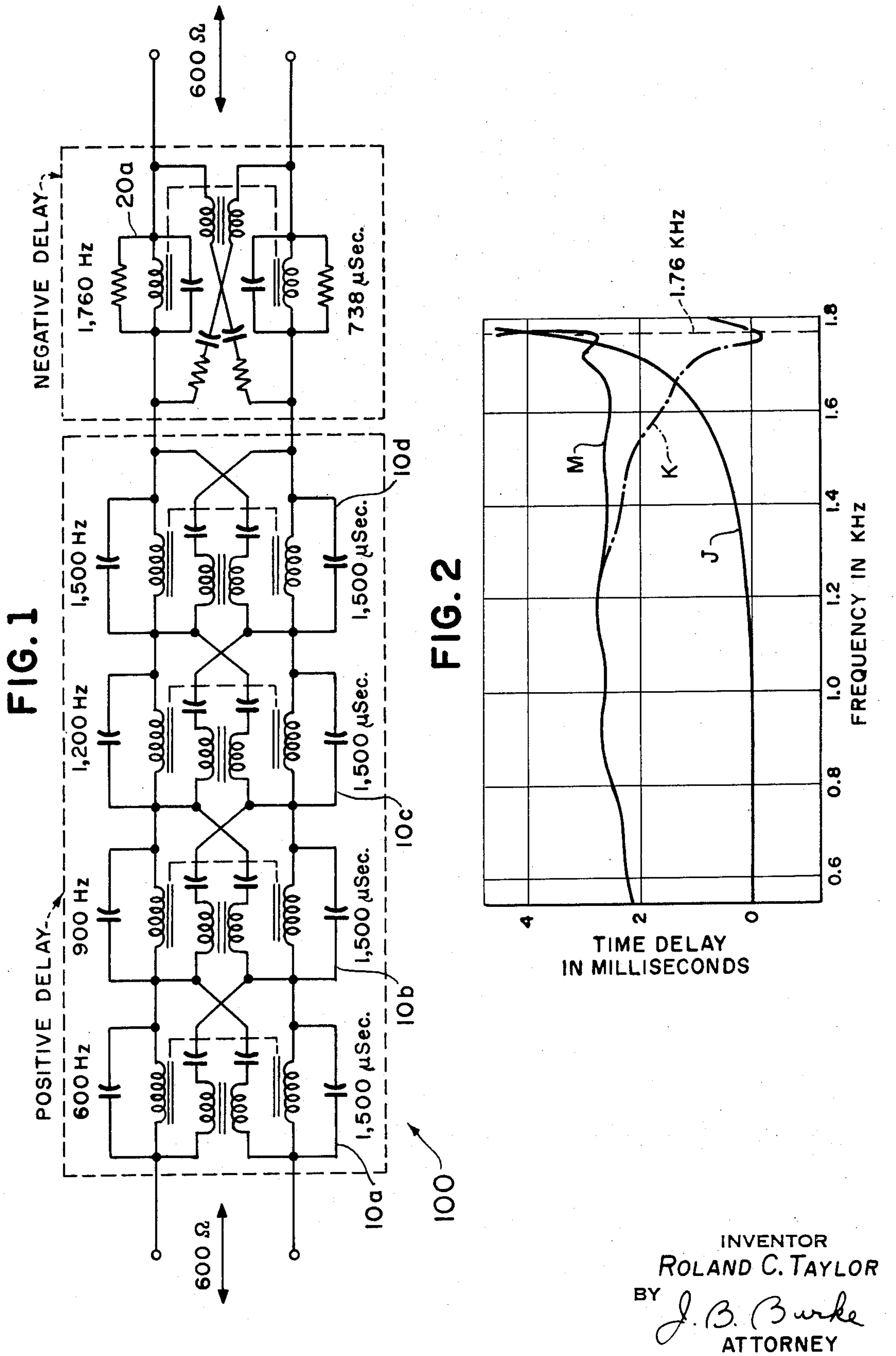
FIG. 1 is a diagram of a delay equalizer network embodying the invention.
FIG. 2 is a diagram used in explaining the delay characteristics of the network of FIG. 1.

Circuit 100 of FIG. 1 illustrates a practical application for a system having terminal impedances of 600 ohms. Four lattice sections 10*a*–10*d* each similar to lattice circuit 10 of FIG. 4 are connected in cascade. The circuits are each designed for a positive delay of 1,500 microseconds at 600, 900, 1,200 and 1,500 hertz respectively. A single negative delay equalizer section 20*a* similar to lattice circuit 20 of FIG. 6 is connected to lattice section 10*d*. Section 20*a* has a center peak frequency at 1,760 hertz with a negative time delay of 738 microseconds.

FIG. 2 shows the effect produced by circuit 100 when connected to a transmission line in which time delay indicated by curve J occurs. Curve K is the composite characteristic produced by the five delay circuits 10*a*–10*d* and 20*a*. Curve M represents the sum of curves J and K. It will be noted that the delay has been substantially equalized throughout the passband up to approximately 1,760 hertz.

Referring again to FIG.1, it will be understood that the positive delay sections 10*a* and 10*d* compensate for and equalize time delay up to about approximately 1,500 hertz. The region beyond 1,500 hertz which is indicated as very steep in curve J is equalized by the single negative delay section 20*a*. The positive delay equalizer lattice sections 10*a*–10*d* need not have a large $q$ factor. Since the $q$ factor has an inverse relationship on the width of the delay characteristic as illustrated by FIG. 5, a small number of positive delay equalizer sections having relatively flat delay characteristics are needed to effect equalization in the region up to 1,500 hertz. This number of sections is very much smaller than would otherwise be required as is apparent in the light of the discussion in connection with FIG. 10.

In this example it is preferred that the negative equalizer delay section 20*a* only compensates for the steep part of curve J near the cutoff point of the passband. The negative delay section has the required steep slope as illustrated by FIG. 7. Since the negative delay section only effects equalization over a relatively small frequency range near the cutoff point, just one lattice section 20*a* is sufficient in this example.

It will now be apparent that by employing both negative and positive delay equalizer circuit sections, a delay equalizer can be constructed which provides uniform equalized delay in a transmission channel, such delay being smaller in magnitude than the equalized delay obtainable by a delay equalizer employing only positive delay sections because the negative delay equalizer sections subtract from the delay in the line. Furthermore the delay equalizer embodying the invention employs a lesser number of equalizing sections and is less complex and costly than prior delay equalizers employing only positive delay sections.

While the foregoing has described equalization delay independent of frequency, i.e., flat, it can be seen by those skilled in the art that the techniques herein described can be applied to provide for any desired delay characteristic whether straight or curved. Thus, in FIG. 10, line M—M can be either sloping or curved in any manner desired.

While the invention has been described with a certain degree of particularity, it can, nevertheless, be seen by the examples and descriptions hereinabove set forth that many modifications and variations of the invention may be made without departing from the spirit and scope thereof.

What is claimed is:

1. A delay equalizer circuit for a transmission line transmitting signals occupying a pre-determined frequency band and having a frequency-delay characteristic which rises relatively slowly in a first portion of the band and which rises relatively rapidly in a second portion of the band comprising; a plurality of positive delay equalizer circuit sections connected together in cascade each including, a pair of parallel resonant circuits having parallel connected a capacitor and an inductor wherein said parallel resonant circuits are connected in series with opposite sides of the transmission line, and a pair of series resonant circuits having series connected a capacitor and an inductor wherein said series resonant circuits are connected across said transmission line to opposite alternate ends of said parallel resonant circuits; wherein said positive delay circuit sections are tuned for adjacent frequencies to provide overlapping frequency-delay characteristics covering said first portion of said band resulting in positive delay of said signals in said first portion of said band; and at least one negative delay equalizer circuit section connected in series with said cascaded positive delay sections, wherein said negative delay section includes; a pair of parallel resonant circuits each having parallel connected a capacitor, an inductor, and a first resistor, wherein said last mentioned parallel resonant circuits are connected in series with opposite sides of said transmission line, and a pair of series resonant circuits each having series connected a capacitor, an inductor, and a second resistor, wherein said last mentioned series resonant circuits are connected across said transmission line to opposite alternate ends of said parallel resonant circuits of said negative delay section; wherein said negative delay circuit section is tuned for a frequency in said second portion of said band, and wherein said first resistors are sufficiently smaller in resistance than said second resistors to provide for a predominant current path of said signals through said parallel resonant circuits throughout said second portion of said band including said tuned frequency of said negative delay section, whereby negative delay of said signals is obtained in said second portion of said band tending to compensate for and equalize said rapidly rising portion of said frequency delay characteristic of said transmission line.

2. A delay equalizer circuit as claimed in claim 1 wherein a tolerably small attenuation $x$ of said negative delay circuit section is first preselected, wherein the resistance value of said first resistors, $R_2$, of said parallel resonant circuits is selected substantially in accordance with the following equation:

$$R_2 = R_0 \tanh \frac{x}{2}$$

where $R_o$ is the effective load resistance of the load receiving said signals; and wherein the impedances of each said series resonant and parallel resonant circuits, respectively $Z_1$ and $Z_2$, of said negative delay section are selected substantially in accordance with the following equation:

$$Z_1 Z_2 = R_o^2.$$

3. A delay equalizer circuit as claimed in claim 2 wherein the amount of negative delay $T_o$, and the values of the circuit elements of said negative delay section are substantially in accordance with the following equations:

$$T_0 = \frac{\left(4Q \sinh \frac{x}{2}\right)}{W_0}$$

$$Q = \frac{R_2}{W_0 L_2}$$

$$W_0^2 = \frac{1}{L_2 C_4}$$

$$R_1 R_2 = R_0^2$$

$$R_1 = R_0 \coth \frac{x}{2}$$

$$L_3 = \frac{R_1 Q}{W_0}$$

$$C_4 = \frac{Q}{W_0 R_2}$$

and $$C_1 = \frac{1}{R_1 Q W_0}$$

where:

- $R_1$ is the resistance value of each of said second resistors in said series resonant circuits,
- $L_2$ is said inductance in each of said parallel resonant circuits,
- $C_4$ is said capacitance in each of said parallel resonant circuits,
- $L_3$ is said inductance in each of said series resonant circuits,
- $C_1$ is said capacitance in each of said series resonant circuits, and
- $W_o$ is said tuned resonant frequency of said parallel and series resonant circuits.

4. A negative time delay transmission equalizer lattice section for a transmission line transmitting signals occupying a predetermined frequency band wherein said transmission line imparts a transmission time delay to said signals in at least a portion of said band, comprising; a pair of parallel resonant circuits each having parallel connected a capacitor, an inductor, and a first resistor, wherein said parallel resonant circuits are connected in series with opposite sides of said transmission line, and a pair of series resonant circuits each having series connected a capacitor, an inductor and a second resistor, wherein said series resonant circuits are connected across said transmission line to opposite alternate ends of said parallel resonant circuits; wherein said parallel and series resonant circuits are tuned for a frequency in said portion of said band, and wherein said first resistors are sufficiently smaller in resistance than said second resistors to provide for a predominant current path of said signals through said parallel resonant circuits throughout said frequency band including said tuned frequency of said resonant circuits, whereby negative delay of said signals is obtained in said portion of said band tending to compensate for and equalize said time delay imparted by said transmission line.

5. A delay equalizer circuit as claimed in claim 4 wherein a tolerably small attenuation $x$ of said negative delay equalizer is first preselected, wherein the resistance value of said first resistors, $R_2$, of said parallel resonant circuits is selected substantially in accordance with the following equation:

$$R_2 = R_0 \tanh \frac{x}{2}$$

where $R_0$ is the effective load resistance of the load receiving said signals; and wherein the impedances of each said series resonant and parallel resonant circuits, respectively $Z_1$, and $Z_2$, of said negative delay section are selected substantially in accordance with the following equation:

$$Z_1 Z_2 = R_0 2.$$

6. A delay equalizer circuit as claimed in claim 5 wherein the amount of negative delay $T_o$, and the values of the circuit elements of said negative delay equalizer are substantially in accordance with the following equations:

$$T_0 = \frac{\left(4Q \sinh \frac{x}{2}\right)}{W_0}$$

$$Q = \frac{R_2}{W_0 L_2}$$

$$W_0^2 = \frac{1}{L_2 C_4}$$

$$R_1 R_2 = R_0^2$$

$$R_1 = R_0 \coth \frac{x}{2}$$

$$L_3 = \frac{R_1 Q}{W_0}$$

$$C_4 = \frac{Q}{W_0 R_2}$$

and $$C_1 = \frac{1}{R_1 Q W_0}$$

where:

- $R_1$ is the resistance value of each of said second resistors in said series resonant circuits,
- $L_2$ is said inductance in each of said parallel resonant circuits,
- $C_4$ is said capacitance in each of said parallel resonant circuits,
- $L_3$ is said inductance in each of said series resonant circuits,
- $C_1$ is said capacitance in each of said series resonant circuits, and
- $W_o$ is said tuned resonant frequency of said parallel and series resonant circuits.

* * * * *